US 8,564,522 B2

(12) United States Patent
Kim

(10) Patent No.: US 8,564,522 B2
(45) Date of Patent: Oct. 22, 2013

(54) REDUCED-POWER COMMUNICATIONS WITHIN AN ELECTRONIC DISPLAY

(75) Inventor: Taesung Kim, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 865 days.

(21) Appl. No.: 12/751,779

(22) Filed: Mar. 31, 2010

(65) Prior Publication Data

US 2011/0242088 A1 Oct. 6, 2011

(51) Int. Cl.
| G06F 3/038 | (2013.01) |
| G09G 5/00 | (2006.01) |
| G09G 3/36 | (2006.01) |
| H04B 1/66 | (2006.01) |

(52) U.S. Cl.
USPC ............ 345/99; 345/98; 345/204; 345/214; 375/240.23

(58) Field of Classification Search
USPC ............. 370/468; 375/240–241; 345/87–104, 345/204–215, 690–699
See application file for complete search history.

(56) References Cited

U.S. PATENT DOCUMENTS

| 4,517,596 A * | 5/1985 | Suzuki ................... 375/240.05 |
| 5,272,529 A * | 12/1993 | Frederiksen .............. 375/240.22 |
| 5,739,307 A * | 4/1998 | Johnson et al. ............. 536/23.51 |
| 6,122,504 A * | 9/2000 | Niepel et al. ................ 455/422.1 |
| 6,335,718 B1 * | 1/2002 | Hong et al. ........................ 345/98 |
| 6,416,410 B1 * | 7/2002 | Abou-Samra et al. .......... 463/31 |
| 6,954,201 B1 * | 10/2005 | Ludden et al. ................ 345/204 |
| 7,095,398 B2 | 8/2006 | Fish |
| 7,382,345 B2 * | 6/2008 | Hong ............................... 345/99 |
| RE40,864 E * | 7/2009 | Hong et al. ..................... 345/98 |
| 7,570,819 B2 | 8/2009 | Sung et al. |
| 2003/0201965 A1 | 10/2003 | Sunohara et al. |
| 2004/0151108 A1 * | 8/2004 | Blasco Claret et al. ........ 370/206 |
| 2005/0104853 A1 * | 5/2005 | Sitalasai et al. ............... 345/163 |
| 2005/0128175 A1 * | 6/2005 | Hong ............................ 345/100 |
| 2005/0163043 A1 * | 7/2005 | Barthel et al. ................ 370/218 |
| 2006/0061822 A1 | 3/2006 | Sung et al. |
| 2007/0200818 A1 * | 8/2007 | Miyamoto et al. ............ 345/104 |
| 2008/0030490 A1 * | 2/2008 | Son et al. ....................... 345/205 |
| 2008/0144505 A1 * | 6/2008 | Isnardi et al. ................. 370/235 |
| 2009/0022229 A1 | 1/2009 | Sung |
| 2009/0284509 A1 * | 11/2009 | Choe ............................. 345/208 |
| 2011/0037758 A1 * | 2/2011 | Lim et al. ...................... 345/213 |
| 2011/0216651 A1 * | 9/2011 | Bansal et al. ................. 370/235 |

FOREIGN PATENT DOCUMENTS

| CN | 1885968 A | * 12/2006 |
| JP | 2002366107 A | 12/2002 |

OTHER PUBLICATIONS

International Search Report & Written Opinion for PCT Application No. PCT/US2011/028343 dated May 27, 2011, 12 pgs.

* cited by examiner

Primary Examiner — Alexander Eisen
Assistant Examiner — Patrick F Marinelli
(74) Attorney, Agent, or Firm — Fletcher Yoder PC

(57) ABSTRACT

A method for reducing power consumption of an electronic display is provided. In one embodiment, the method includes transmitting data packets over a data channel between a timing controller and a column driver of the display. Data transmission modes may be read from headers of the data packets, and image data of the packets may be processed at the column driver based on their respective data transmission modes. Further, the data channel may be intermittently deactivated during transmission of the data packets based on their respective data transmission modes. Additional methods, systems, and devices relating to electronic displays are also disclosed.

19 Claims, 12 Drawing Sheets

REDUCED-POWER COMMUNICATIONS WITHIN AN ELECTRONIC DISPLAY

BACKGROUND

1. Technological Field

This relates generally to electronic displays and to a technique for driving such displays.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

LCDs typically include an LCD panel having, among other things, a liquid crystal layer and various circuitry for controlling orientation of liquid crystals within the layer to modulate an amount of light passing through the LCD panel and thereby render images on the panel. The control circuitry of the LCD may include a timing controller that receives image data from a host system (e.g., from a graphics processing unit) to be rendered on the LCD. The timing controller may transmit data signals and timing signals to source driving circuitry (also referred to as column driver circuitry) that generates analog signals based on the data and timing signals and applies the analog signals to pixels of the LCD to render images.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays and various methods for operating and sending data to such displays. Transmission of data between the timing controller and a column driver of a display consumes power in proportion to the length and frequency of the transmission. In one embodiment of the present disclosure, data packets may be transmitted over a point-to-point interface between the timing controller and a column driver in accordance with various selectable transmission modes. The selectable transmission modes may include a normal mode, in which data values are separately provided over the interface for each pixel to be driven; a variable-length coding mode, in which one or more transmitted data values represent the level at which one or more series of pixels are to be driven and how many pixels are within each series; and a sampling skip mode, in which the data values for a row of pixels driven by the column driver are the same as the data values for the previous row of pixels driven by the column driver. The latter two modes permit data channels between the timing controller and the column driver to be deactivated or placed in a lower-power state. Consequently, transmission of data in this manner may reduce power consumption by an LCD and increase battery life in portable devices.

Various refinements of the features noted above may exist in relation to the presently disclosed embodiments. Additional features may also be incorporated in these various embodiments as well. These refinements and additional features may exist individually or in any combination. For instance, various features discussed below in relation to one or more of the illustrated embodiments may be incorporated into any of the above-described embodiments alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
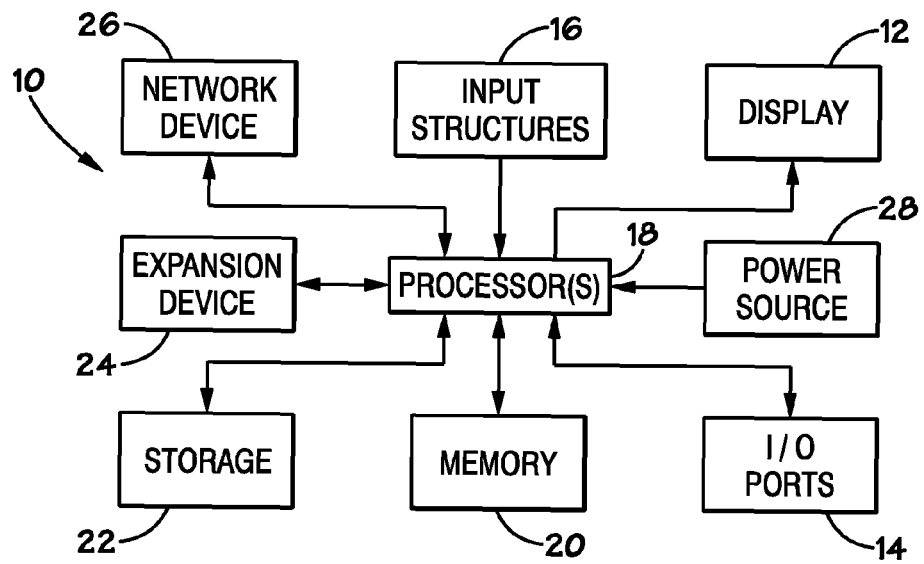
FIG. 1 is a block diagram of exemplary components of an electronic device, in accordance with aspects of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

Certain embodiments of the present disclosure are generally directed to reducing power consumption by an electronic display, such as an LCD, by reducing the power required to communicate data to one or more column driver integrated circuits of the display. For instance, the duration of data transmission between a timing controller and a column driver of a display may be reduced by identifying series of pixels having the same color in an image to be rendered on the display, and then reducing the amount of data representative of these series to be transmitted between the timing controller and the column driver. Upon reducing the duration of data transmissions, the data channels between the timing controller and the one or more column drivers may be temporarily deactivated (i.e., shut-down or placed in a lower-power state) to reduce power consumption by the display.

In one example, a uniform sequence of pixels in a row of an image is encoded in a data packet as one unique pixel value representative of the color of the pixels (and the hardware level to which the pixels of a display are to be driven to render the image) and an associated repetition number that indicates how many times this value is to be repeated (i.e., the number of pixels to be driven to the hardware level represented by the unique pixel value) when received by the column driver. The fact that the image data is encoded in this manner may be indicated within a configuration header of the data packet such that the column driver may determine the data transmission mode and properly decode the data packet. Additionally, if a row of pixels of a display panel is to be driven to the same level as the previous row of pixels, the data packet may include an indication within the header that the column driver is to drive a row of pixels to the same value as the previous row. In this instance, the column driver may retain the pixel data for the previous row, and the data packet transmitted to the column driver for the next row may include only the header (with an appropriate mode indication) without any pixel data. In another transmission mode, the data packet may include a header indicating a "normal" or non-compressed mode in which a pixel value is transmitted for each pixel in a row of pixels to be driven by the column driver. With these foregoing features in mind, a general description of electronic devices including a display that may use the presently disclosed technique is provided below.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion card(s) 24, networking device 26, and power source 28.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

Figure 2:
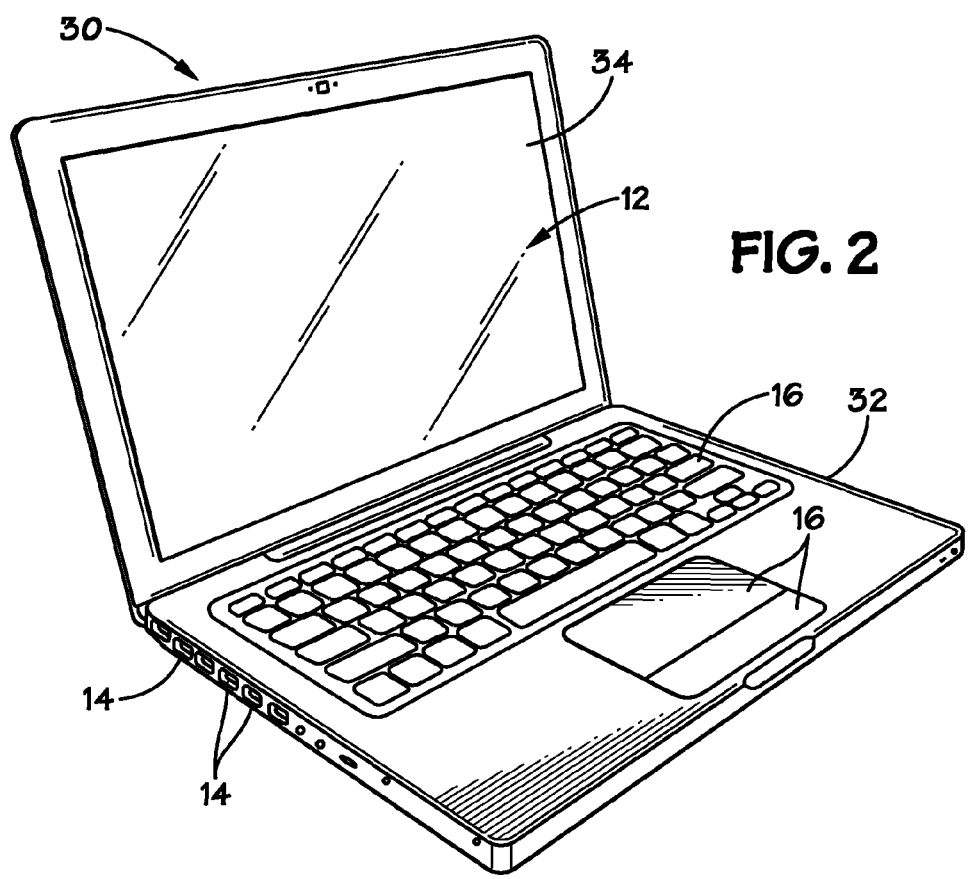
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac Pro® available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
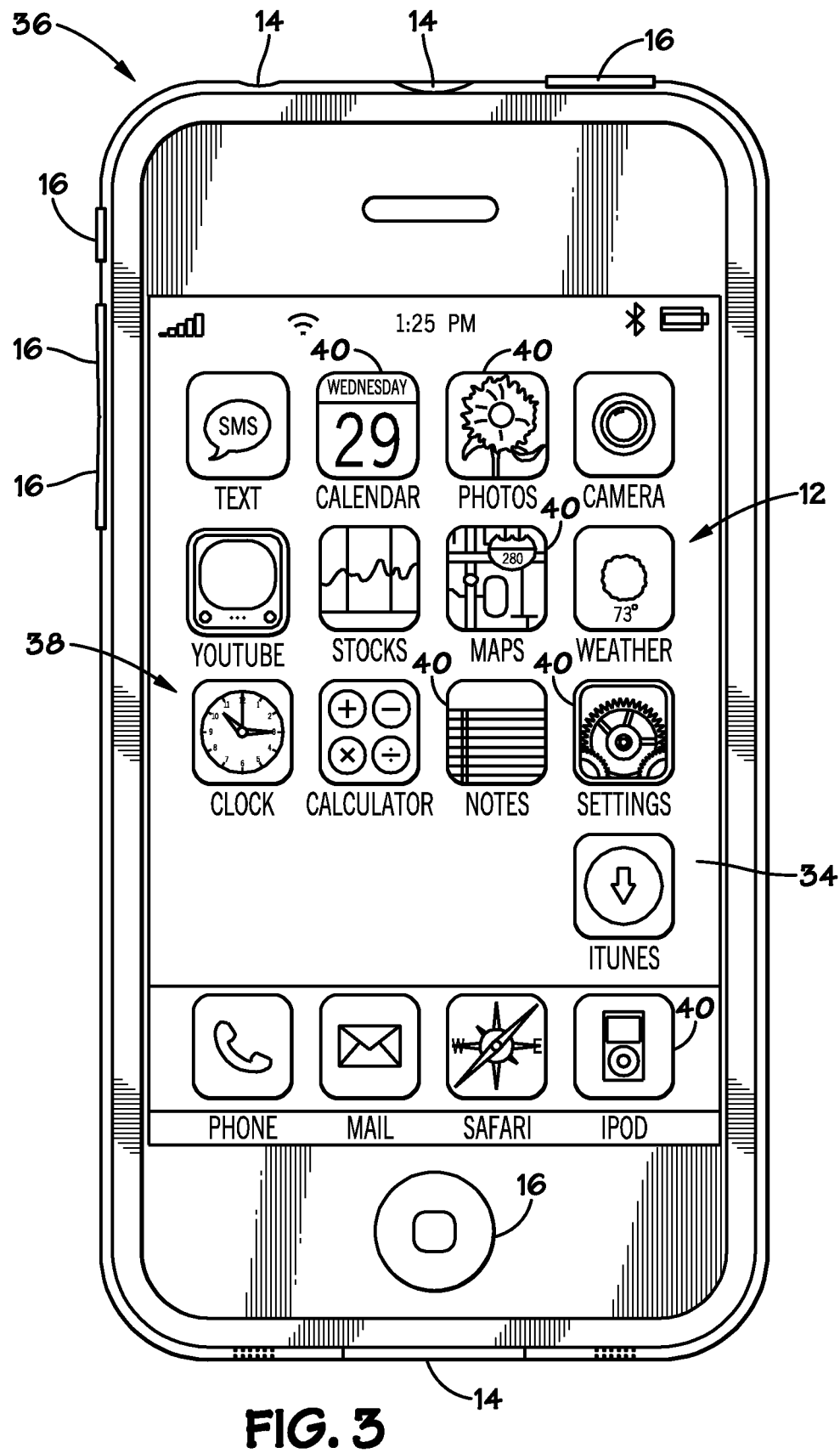
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPod® or iPhone® available from Apple Inc.

Handheld device 36 of the presently illustrated embodiment includes a display 12, which may be in the form of an LCD 34. The LCD 34 may display various images generated by the handheld device 36, such as a graphical user interface (GUI) 38 having one or more icons 40. The device 36 may also include various I/O ports 14 to facilitate interaction with other devices, and user input structures 16 to facilitate interaction with a user.

Figure 4:
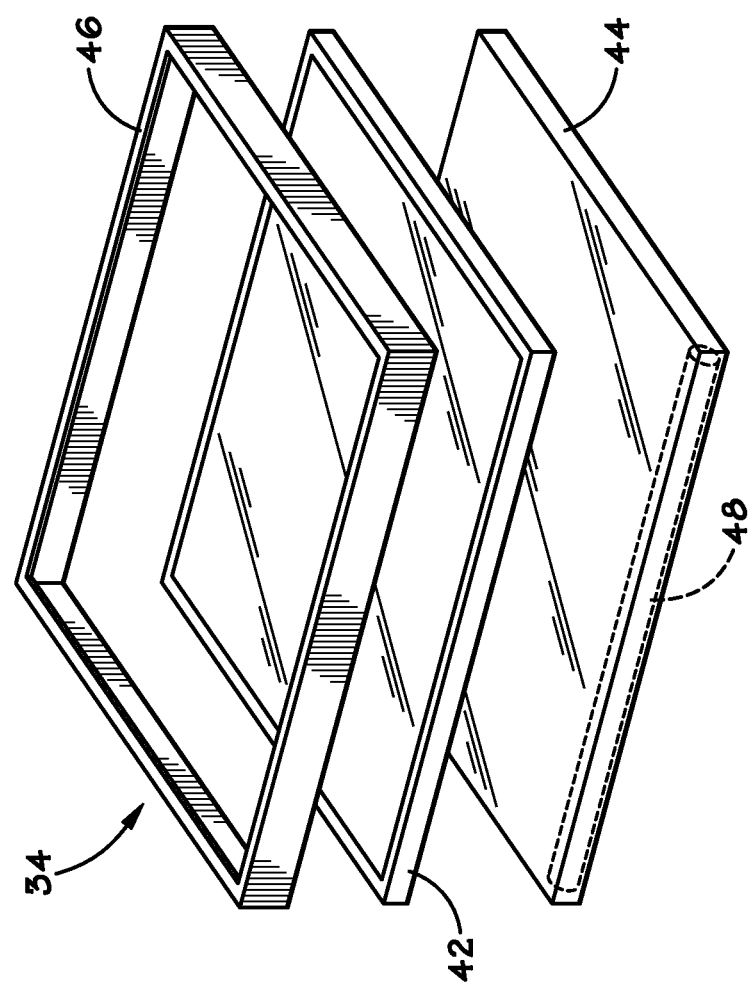
FIG. 4 is an exploded view of a liquid crystal display (LCD) in accordance with aspects of the present disclosure.

One example of an LCD display 34 is depicted in FIG. 4 in accordance with one embodiment. The depicted LCD display 34 includes an LCD panel 42 and a backlight unit 44, which may be assembled within a frame 46. As may be appreciated, the LCD panel 42 may include an array of pixels configured to selectively modulate the amount and color of light passing from the backlight unit 44 through the LCD panel 42. For example, the LCD panel 42 may include a liquid crystal layer, one or more thin film transistor (TFT) layers configured to control orientation of liquid crystals of the liquid crystal layer via an electric field, and polarizing films, which cooperate to enable the LCD panel 42 to control the amount of light emitted by each pixel. Additionally, the LCD panel 42 may include color filters that allow specific colors of light to be emitted from the pixels (e.g., red, green, and blue).

The backlight unit 44 includes one or more light sources 48. Light from the light source 48 is routed through portions of the backlight unit 44 (e.g., a light guide and optical films) and generally emitted toward the LCD panel 42. In various embodiments, light source 48 may include a cold-cathode fluorescent lamp (CCFL), one or more light emitting diodes (LEDs), or any other suitable source(s) of light. Further, although the LCD 34 is generally depicted as having an edge-lit backlight unit 44, it is noted that other arrangements may be used (e.g., direct backlighting) in full accordance with the present technique.

Figure 5:
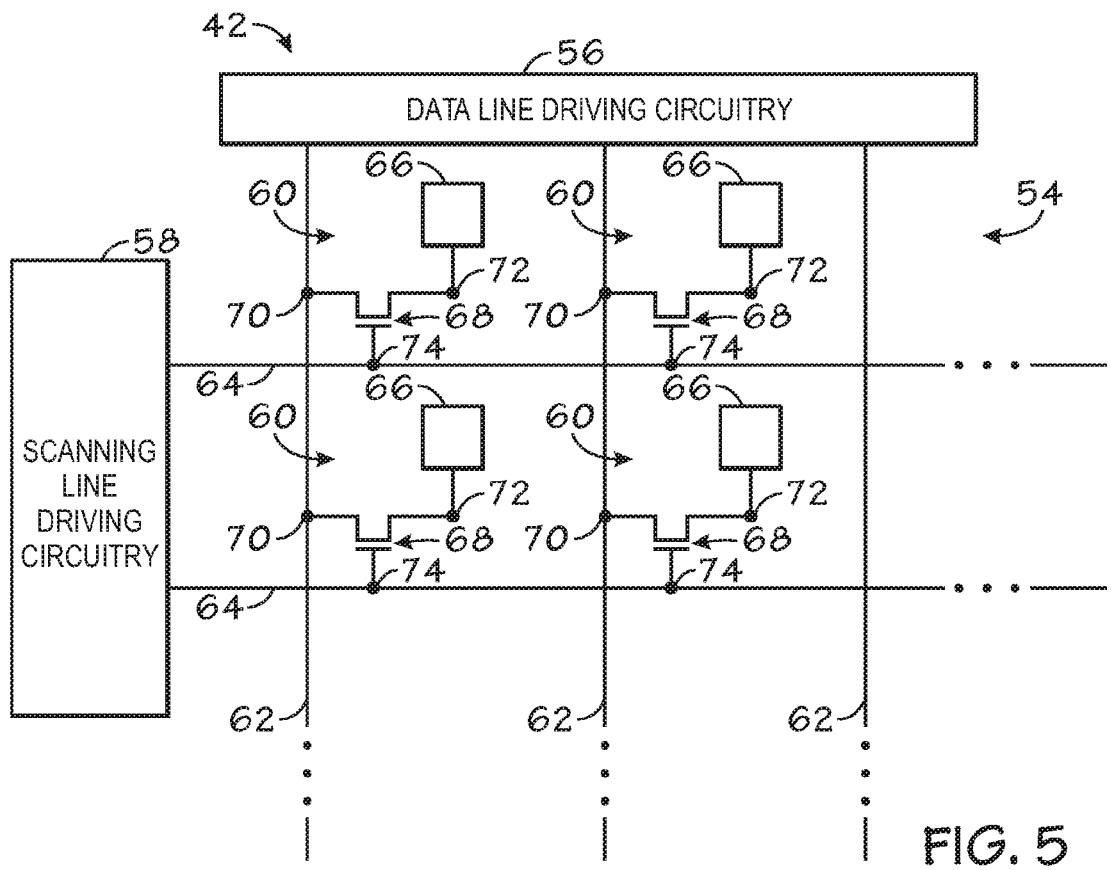
FIG. 5 graphically depicts circuitry that may be found in the LCD of FIG. 4 in accordance with aspects of the present disclosure.

Referring now to FIG. 5, an example of a circuit view of pixel-driving circuitry found in an LCD 34 is provided. For example, the circuitry depicted in FIG. 5 may be embodied on the LCD panel 42 described above with respect to FIG. 4. The pixel-driving circuitry includes an array or matrix 54 of unit pixels 60 that are driven by data (or source) line driving circuitry 56 and scanning (or gate) line driving circuitry 58. As depicted, the matrix 54 of unit pixels 60 forms an image display region of the LCD 34. In such a matrix, each unit pixel 60 may be defined by the intersection of data lines 62 and scanning lines 64, which may also be referred to as source lines 62 and gate lines 64. The data line driving circuitry 56 may include one or more driver integrated circuits (also referred to as column drivers) for driving the data lines 62. The scanning line driving circuitry 58 may also include one or more driver integrated circuits (also referred to as row drivers).

Each unit pixel 60 includes a pixel electrode 66 and thin film transistor (TFT) 68 for switching the pixel electrode 66. In the depicted embodiment, the source 70 of each TFT 68 is electrically connected to a data line 62 extending from respective data line driving circuitry 56, and the drain 72 is electrically connected to the pixel electrode 66. Similarly, in the depicted embodiment, the gate 74 of each TFT 68 is electrically connected to a scanning line 64 extending from respective scanning line driving circuitry 58.

In one embodiment, column drivers of the data line driving circuitry 56 send image signals to the pixels via the respective data lines 62. Such image signals may be applied by line-sequence, i.e., the data lines 62 may be sequentially activated during operation. The scanning lines 64 may apply scanning signals from the scanning line driving circuitry 58 to the gate 74 of each TFT 68. Such scanning signals may be applied by line-sequence with a predetermined timing or in a pulsed manner.

Each TFT 68 serves as a switching element which may be activated and deactivated (i.e., turned on and off) for a predetermined period based on the respective presence or absence of a scanning signal at its gate 74. When activated, a TFT 68 may store the image signals received via a respective data line 62 as a charge in the pixel electrode 66 with a predetermined timing.

The image signals stored at the pixel electrode 66 may be used to generate an electrical field between the respective pixel electrode 66 and a common electrode. Such an electrical field may align liquid crystals within a liquid crystal layer to modulate light transmission through the LCD panel 42. Unit pixels 60 may operate in conjunction with various color filters, such as red, green, and blue filters. In such embodiments, a "pixel" of the display may actually include multiple unit pixels, such as a red unit pixel, a green unit pixel, and a blue unit pixel, each of which may be modulated to increase or decrease the amount of light emitted to enable the display to render numerous colors via additive mixing of the colors.

In some embodiments, a storage capacitor may also be provided in parallel to the liquid crystal capacitor formed between the pixel electrode 66 and the common electrode to prevent leakage of the stored image signal at the pixel electrode 66. For example, such a storage capacitor may be provided between the drain 72 of the respective TFT 68 and a separate capacitor line.

Figure 6:
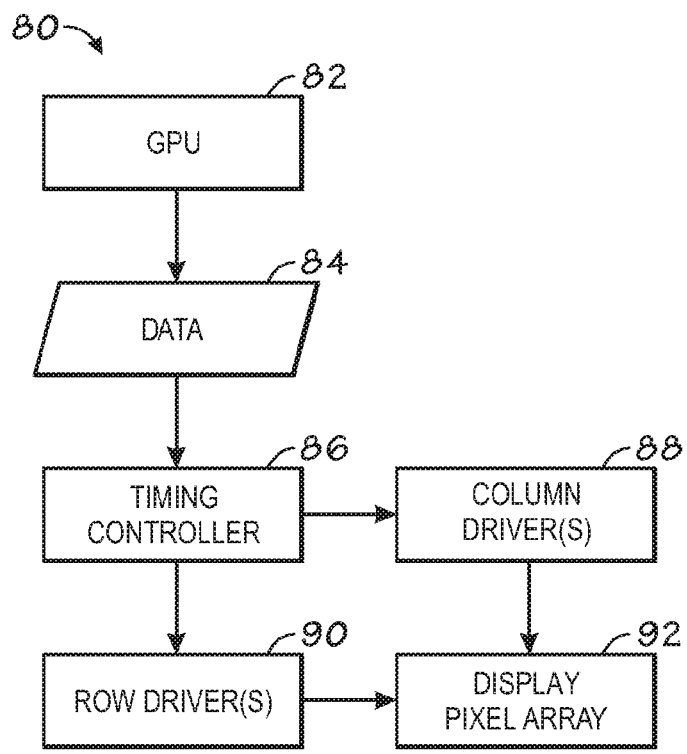
FIG. 6 is a block diagram representative of how the LCD of FIG. 4 receives data and drives a pixel array of the LCD in accordance with aspects of the present disclosure.

Certain components for processing image data and rendering images on an LCD based on such data are depicted in block diagram 80 of FIG. 6 in accordance with one embodiment. In the illustrated embodiment, a graphics processing unit (GPU) 82, or some other processor 18, transmits data 84 to a timing controller 86 of the LCD 34. The data 84 generally includes image data that may be processed by circuitry of the LCD 34 to drive pixels of, and render an image on, the LCD 34. The timing controller 86 may then send signals to, and control operation of, one or more column drivers 88 (or other data line driving circuitry 56) and one or more row drivers 90 (or other scanning line driving circuitry 58). These column drivers 88 and row drivers 90 may generate analog signals for driving the various pixels of a pixel array 92 of the LCD 34. In some embodiments, the timing controller 86 transmits data and timing signals to the column drivers 88, which then forward timing information to the row drivers 90. In other embodiments, the timing controller 86 may provide timing information directly to the column drivers 88 and the row drivers 90.

Figure 7:
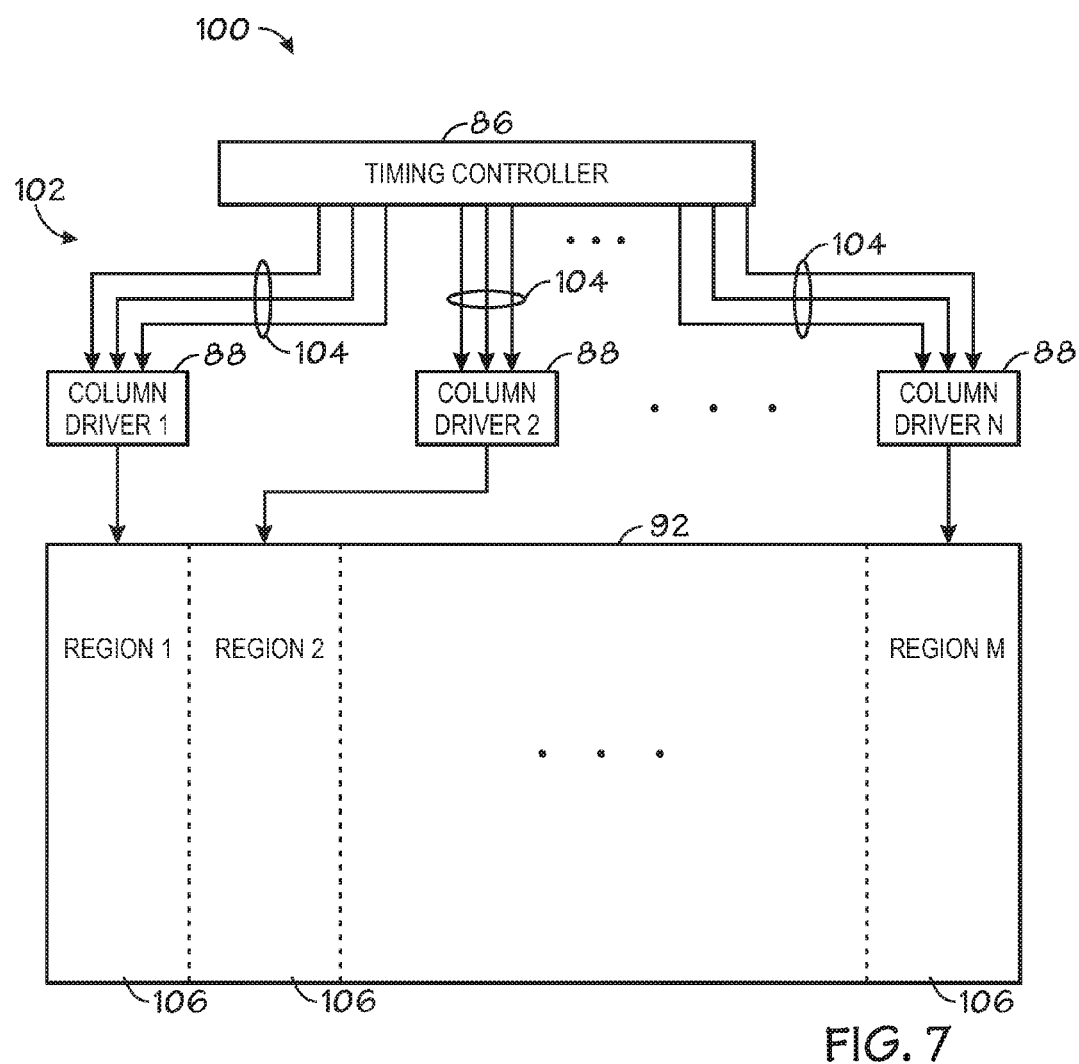
FIG. 7 generally illustrates a point-to-point bus interface for routing signals between a timing controller and column drivers of the LCD of FIG. 4 in accordance with aspects of the present disclosure.

Additional details of the operation of the timing controller 86 and the column drivers 88 may be better understood with reference to diagram 100 provided in FIG. 7 in accordance with one embodiment. Diagram 100 generally depicts a point-to-point bus interface 102 between the timing controller 86 and multiple column drivers 88. Rather than having a common bus shared by all of the column drivers 88, in the depicted point-to-point bus interface 102 each column driver 88 receives data signals and timing signals from the timing controller 86 via respective signal lines 104. For example, the signal lines 104 to each column driver 88 may include two data signal lines and one clock signal line, as generally depicted in FIG. 7. It is noted, however, that each set of signal lines 104 between the timing controller 86 and an individual column driver 88 may include any number of desired signal lines greater than or less than the three signal lines depicted in FIG. 7.

The LCD 34 may include any desired number ("N") of column drivers 88. The column drivers 88 apply drive signals to data lines within an associated number ("M") of regions 106 of the pixel array 92 to render desired images. In one embodiment, the number of regions 106 is equal to the number of column drivers 88, and each column driver 88 is responsible for driving the pixels within its associated region 106. By way of further example, in one embodiment an LCD 34 may have a display resolution of 1920×1200, and include ten column drivers 88. In this embodiment, each region 106 may generally be associated with a resolution of 192 (i.e., one tenth of the 1920 columns of the display)×1200, and the column driver 88 for each region 106 may provide the drive signals that enable rendering of images by the pixels of the region 106. In another embodiment the pixel array 92 may have a total resolution of 2560×1600, and each region 106 may include a resolution of 256×1600 pixels. The present techniques may be generally applied to displays having other resolutions as well.

Although the preceding examples included ten column drivers 88 in associated regions 106, it will be appreciated that different numbers of column drivers 88 and regions 106 may be used in full accordance with the present techniques. For example, other embodiments may include more or fewer than ten column drivers 88, and may include but a single column driver 88 for providing drive signals to the entire pixel array 92.

Figure 8:
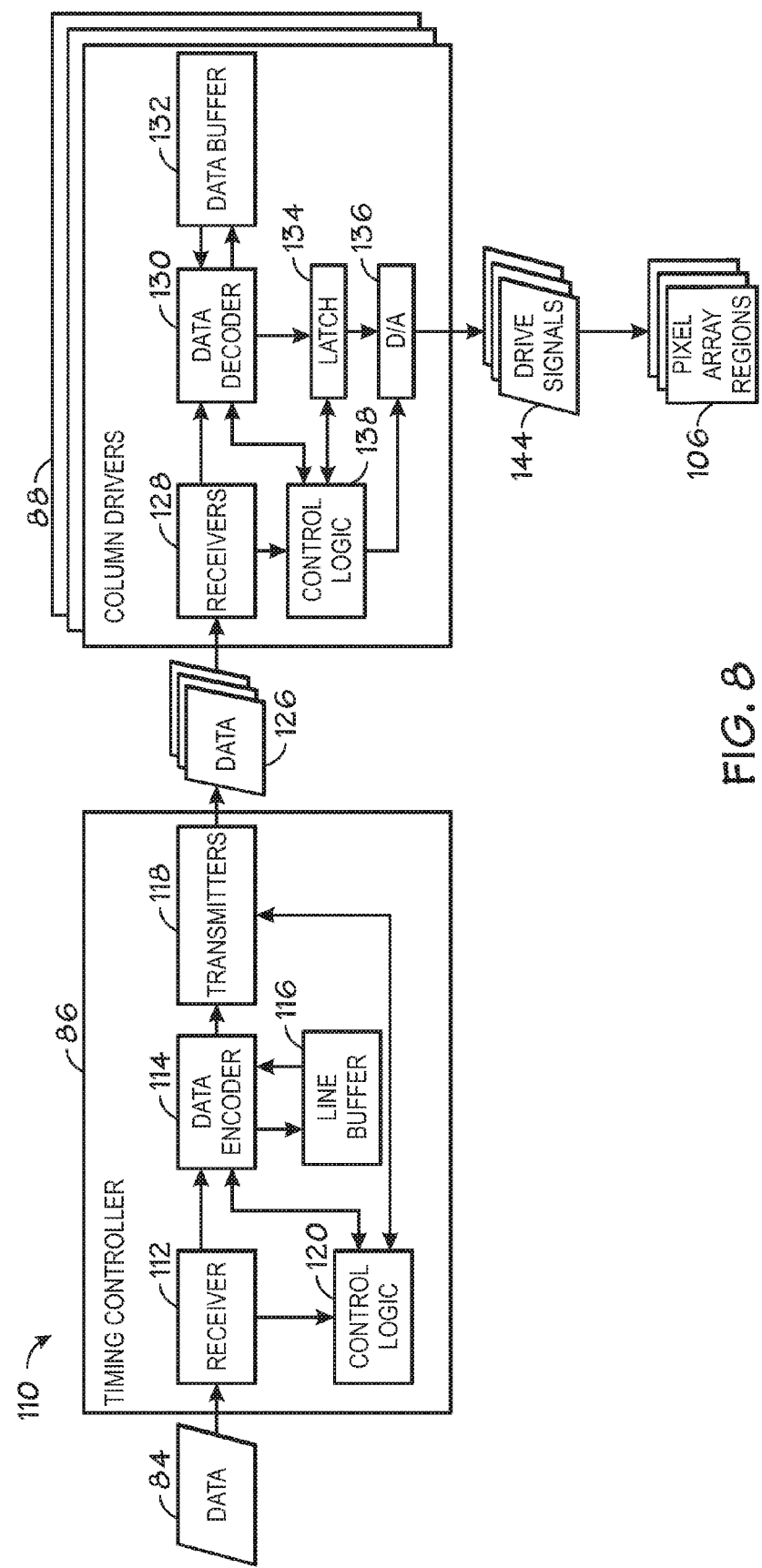
FIG. 8 is a block diagram generally depicting functional circuit components of the timing controller and column drivers of FIG. 7 in accordance with aspects of the present disclosure.

Certain examples of functional components of the timing controller 86 and the column drivers 88 are depicted by way of block diagram 110 of FIG. 8 in accordance with one embodiment. The timing controller 86 may include a receiver 112 for receiving data 84, which may be provided by the GPU 82 (FIG. 6), some other processor 18 (FIG. 1), or some other source. The data 84 may be image data, such as video or static images, to be rendered on an LCD 34. A data encoder 114 may operate with a line buffer 116 to process the data 84 and output data 126 for transmission to the column drivers 88 via transmitters 118. The output image data 126 may be the same as the input image data 84 or may include encoded data representative of the input data 84. The output data 126 may also include timing signals. The timing controller 86 includes control logic 120 for coordinating operations of the various components. As discussed in greater detail below, the data encoder 114 may process or encode the data 84 in accordance with various transmission modes depending on one or more characteristics of the data 84, such as the level of redundancy in the data 84.

The timing controller 86 may transmit data 126 to receivers 128 of the column drivers 88. Each column driver 88 may also include a data decoder 130 for decoding or otherwise processing the data 126 and writing data values to a latch 134. Data buffers 132 of the column drivers 88 may temporarily store decoded data to facilitate writing of data values to the latches 134 during certain transmission modes described in greater detail below. The encoded data 126 will generally include data values that may be converted into drive signals for the pixels of region 106 to be driven by the associated column driver 88. The data decoder 130 writes such values to the latch 134, and such values are converted, via digital-to-analog conversion circuitry 136, to analog drive signals 144 applied to the various columns of the pixel array regions 106. Control logic 138 is provided to determine the transmission mode of the incoming data 126 (to enable proper processing of the data) and to control operation of the column drivers 88.

Figure 9:
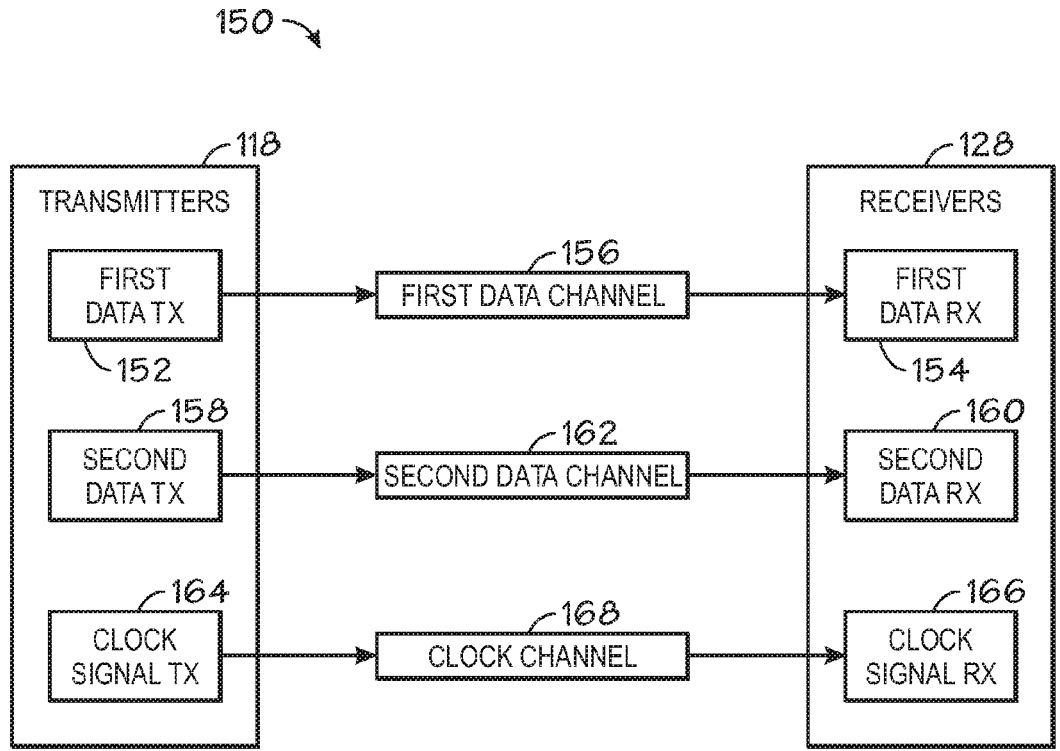
FIG. 9 generally illustrates data channels between the timing controller and a column driver of FIG. 8 in accordance with aspects of the present disclosure.

A given LCD 34 may include multiple communication channels between the timing controller 86 and a column driver 88, as generally depicted in block diagram 150 of FIG. 9 in accordance with one embodiment. For example, the transmitters 118 and the receivers 128 may allow for three communications channels between the timing controller 86 and a particular column driver 88. As depicted in FIG. 9, a data transmitter 152 may provide data to a data receiver 154 via a first data channel 156. Likewise, a data transmitter 158 may provide data to a data receiver 160 via a second data channel 162, and clock signals may be provided from clock signal transmitter 164 to clock signal receiver over clock channel 168. While this is generally in accordance with diagram 100 of FIG. 7, in that the data channels 156 and 162, and the clock channel 168, generally correspond to a set of signal lines 104, it is again noted that more or fewer data channels may be provided between the timing controller 86 and a column driver 88.

It is additionally noted that these data channels do not have to be provided on a single, common, circuit board. For instance, in one embodiment, the timing controller 86 is provided on a printed circuit board and the column drivers 88 are disposed on a glass substrate (e.g., the TFT glass) of the LCD 34. In such an embodiment, the data channels 156 and 162, and the clock channel 168, may span from the timing controller 86, over the printed circuit board on which the timing controller 86 is disposed, over a flexible printed circuit connecting the printed circuit board to the glass substrate on which the column drivers 88 are disposed, and over the glass substrate from the flexible printed circuit to the column drivers 88.

As previously noted, the timing controller 86 provides image data and timing data to the column drivers 88, such as via the data channels 156 and 162 and the clock channel 168. The image data may be encoded into packets for transmission to the column drivers 88, and at least some of these packets may be compressed in accordance with the present techniques.

Figure 10:
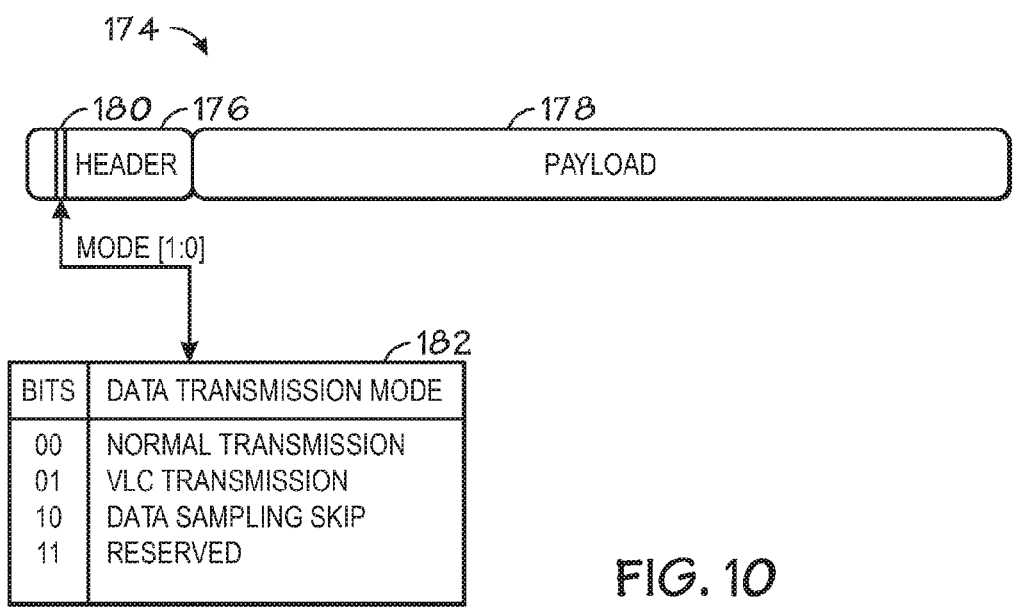
FIG. 10 depicts a data packet that may be transmitted over a data channel of FIG. 9, the data packet including a payload and a header, the header including control bits to indicate a data transmission mode, in accordance with aspects of the present disclosure.

As generally depicted in FIG. 10, an example of a data packet 174 includes a header 176 and a payload 178 that includes data values for pixels within a region 106. The header 176 includes information relating to the payload, and includes a portion 180 that indicates a data transmission mode for the packet 174. In the presently depicted embodiment, the portion 180 includes two bits that may be set by the timing controller 86 to indicate various data transmission modes generally depicted in legend 182. Although several examples of data transmission modes are provided in the legend 182 and described below, it is noted that other modes may also be used in full accordance with the present techniques, and the size of portion 180 may be adapted to allow fewer or greater numbers of modes.

Figure 11:
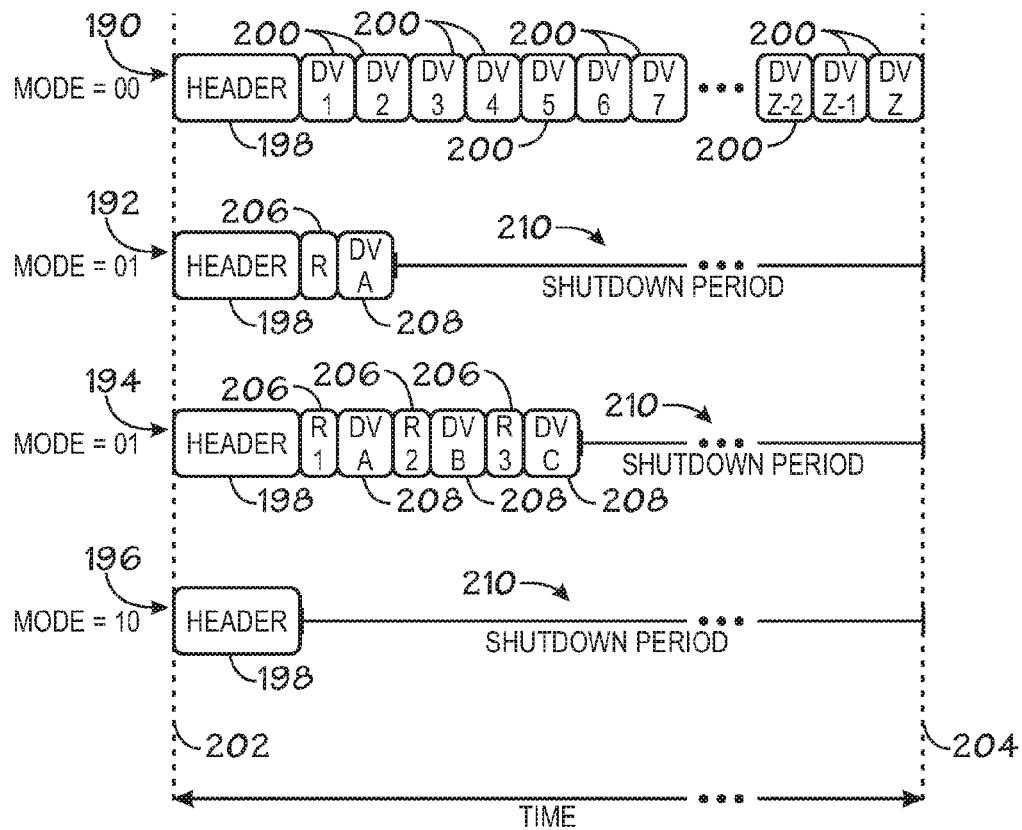
FIG. 11 depicts various data packets formed in accordance with multiple data transmission modes in accordance with aspects of the present disclosure.

In one embodiment, the data transmission modes may be selected by the timing controller 86 based on redundancy in the image data to be transmitted to a column driver 88. Packets 190, 192, 194, and 196 associated with various data transmission modes are provided as examples in FIG. 11. For instance, if the data values for a row of pixels to be driven by a column driver 88 exhibit little redundancy (e.g., as is often the case for a video frame of a movie), the timing controller 86 may transmit data in the payload 178 in accordance with a "normal" transmission mode, as generally represented by data packet 190 in FIG. 11. The data packet 190 includes a header 198 that identifies the selected transmission mode. The payload of the data packet 190 includes individual data values 200 for each pixel in a row of pixels to be driven by the column driver 88 receiving the data packet 190. Consequently, in an embodiment in which the region 106 driven by the column driver 88 has a width of 192 pixels, a data value 200 is provided for each of the 192 pixels (i.e., Z=192).

The header 198 (or some other portion) of the data packet 190 may indicate that the normal transmission mode was selected by the timing controller 86, such as by including two designated bits set to "00". The column driver 88 may read these bits to determine which transmission mode was used by the timing controller 86 in constructing and transmitting the data packet 190. The data packet 190 may be transmitted over a period of time between starting point 202 and ending point 204 (after transmission of all of the data values 200). Accordingly, for a data packet 190, a transmitter and a receiver of the timing controller 86 and column driver 88, respectively, are generally active for the entire time period between starting point 202 and ending point 204. In accordance with the present techniques, however, other data transmission modes may be used to reduce the length of transmission between the timing controller 86 and a column driver 88, enabling one or more data channels to be shut down for greater lengths of time to reduce power consumption. It is noted that shutting down such data channels may include placing one or both of transmitters and receivers of the timing controllers 86 and column drivers 88 into a low-power state.

While certain types of image data may have limited amounts of redundancy, other types of image data may exhibit greater redundancy. For example, computer-generated content often includes a significant amount of data redundancy. For instance, the LCD 34 may be used to display images generated by a word-processing program executed by a computer. In such instances of image data exhibiting significant redundancy, the GPU 82 (FIG. 6) may provide image data indicating that an entire row of pixels within a pixel region 106 is to be driven to the same level (i.e., all of the pixels of the row are to be to same color). Consequently, rather than transmitting 192 individual data values 200 for each pixel (or some other number of individual data values 200 for other embodiments), the timing controller 86 may encode the data using variable-length coding (VLC).

For instance, upon determining that all of the pixels of the row of region 106 are to driven to the same level, the timing controller 86 may select the "VLC" transmission mode, and may encode the data by including a single data value 208 representative of the level to which each pixel of the row is to be driven and a repetition value 206 indicating how may times the data value 208 is to be repeated by the column driver 88 to drive the pixels to that level. Further, the timing controller 86 may set a header portion 180 to "01" (or otherwise indicate that the VLC transmission mode has been selected), and the column driver 88 may read this transmission mode from the packet 192 to enable proper decoding and processing of the data (i.e., the repetition number 206 and the data value 208). The column driver 88 may store the data value 208 in the data buffer 132 (FIG. 8) and may duplicate this data value 208 in accordance with the repetition value 206 to write the data values into the latch 134 for all of the pixels of the row to be driven.

Because the data packet 192 includes only the header 198, a repetition value 206, and a single data value 208, data packet 192 may be transmitted over a data channel between the timing controller 86 and the column driver 88 in a fraction of the time compared to transmission of data packet 190 (which may include 192 times as many, or even more, data values in comparison). Accordingly, the data channel or link between the timing controller 86 and the column driver 88 may be shut down for a time period 210. The time period 210, during which the data channel or its components may be deactivated, placed in a low-power state, or the like, reduces the amount of power consumed by the LCD 34. In addition to variable-length coding, other data compression techniques may also or instead be applied to compress the data. Additionally, in a multi-data-channel configuration (in which data is transmitted to the column driver 88 over multiple data channels), the reduction in the size of the data packet 192 compared to data packet 190 may allow transmission of the data packet 192 over fewer channels (e.g., a single channel) and allow the deactivation of the other data channels. The clock channel may remain active during any data channel shutdown periods.

In other instances, the image data for a row of pixels in a region 106 may exhibit a lesser amount of redundancy, such as multiple sequences of pixels in which the pixels within a sequence are driven to a common level, but the common level is different than another sequence of pixels in the row. In such an instance, the timing controller 86 may detect redundancy in the data and transmit a data packet 194 in accordance with a VLC transmission mode. In contrast to data packet 192 (also encoded under a VLC transmission mode), the data packet 194 includes multiple data values 208 and associated redundancy or repetition numbers 206. The column driver 88 may detect the transmission mode from the data packet 194 and process the packet in a manner similar to that described above.

In yet another instance, the timing controller 86 may detect that a row of pixels in a region 106 is to be driven to the same level as a previous row of pixels within the region 106. For instance, in a word-processing application, images to be generated by the LCD 34 may include a large amount of redundancy not only in the horizontal (i.e., row) direction but also in a vertical (i.e., column) direction. In this instance, the timing controller 86 may select a "data sampling skip" transmission mode, and communicate a data packet 196 including the header 198 (indicating the transmission mode) without any payload data. The column driver 88 receiving the data packet 196 may identify the transmission mode from the header 198 (such as from a portion 180 set to "10" in the header 198), and the column driver 88 may drive the corresponding row of pixels of region 106 based on data previously stored within the latch 134 for a previous row of pixels. The data channel may be closed after transmission of the header 198 (during shutdown period 210) until transmission of the next data packet to conserve power.

It is noted that the bit-size of the repetition numbers 206 and the data values 200 and 208 may be of any suitable size. In one embodiment, the data values 200 and 208 are 24-bit values representative of three, 8-bit values indicative of a drive level for each color component of a pixel (e.g., a red unit pixel, a green unit pixel, and a blue unit pixel). The column driver may thus store the 24-bit value into the latch 134, and the digital-analog conversion circuitry 136 may output separate drive signals for the red, green, and blue unit pixels (or sub-pixels) of the pixel, each based on its corresponding 8-bit portion of the 24-bit data value. The repetition number 206 is generally at least of sufficient size to allow storing of the largest repetition number for the row (i.e., the number of pixels in the row). In one embodiment, the repetition numbers 206 may include 11-bit numbers.

Figure 12:
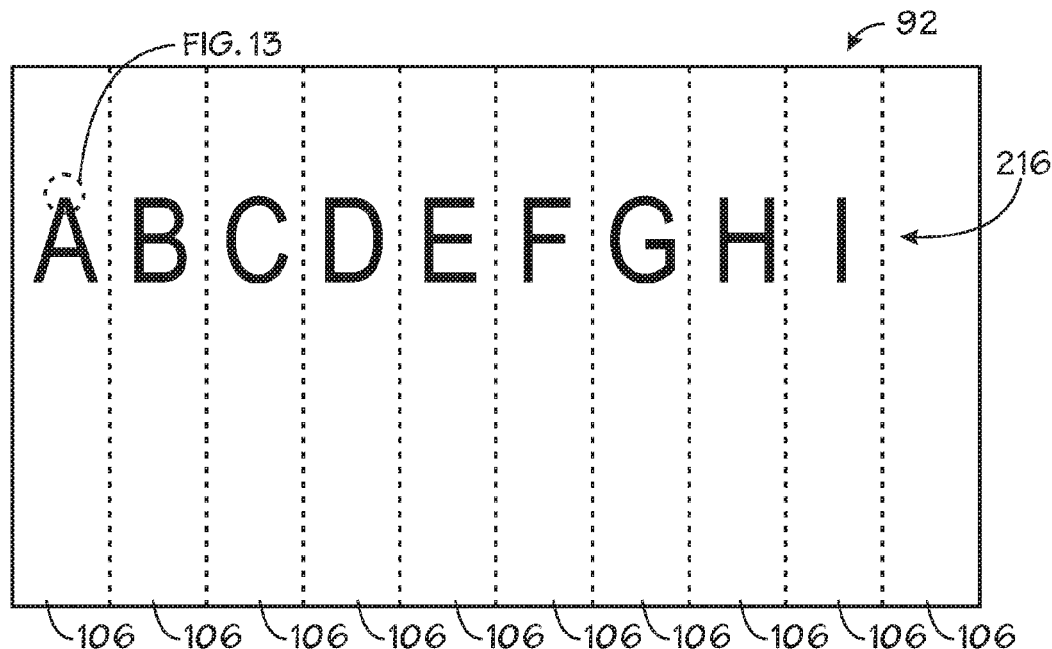
FIG. 12 illustrates a front face of the display panel of an LCD, in which text is displayed across multiple regions of the display panel, in accordance with aspects of the present disclosure.
Figure 13:
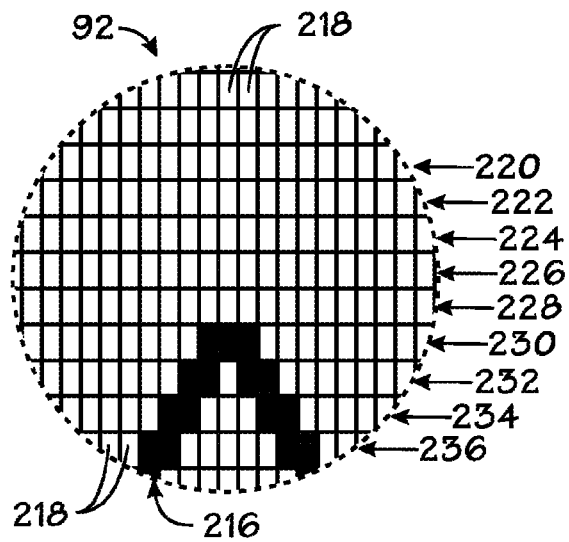
FIG. 13 is a detail, pixel-level view of a small portion of the display of FIG. 12 in accordance with aspects of the present disclosure.

BY way of further example, the above data packets and data transmission modes may be better understood with reference to FIGS. 12 and 13, which generally depict the rendering of black text on a white background via the pixel array 92. As depicted in FIG. 12, a row of text 216 may span the regions 106 of the pixel array 92. Rather than transmitting individual data values for each pixel of each row of a region 106, the present techniques may be employed to reduce the size of data transmitted between the timing controller 86 and the column drivers 88, and may reduce the amount of power consumed as a result of such transmissions.

With reference to the detail view of FIG. 13, a region 106 of the pixel array 92 may exhibit a significant amount of redundancy in the levels to which pixels 218 are driven. (It is noted that each pixel 218 may include one or more unit pixels 60, such as each of a red unit pixel, a green unit pixel, and a blue unit pixel.) For example, rows 220, 222, 224, 226 and 228 include pixels 218 all driven to the same level (e.g., white). Row 230 includes three pixels 218 driven to a different, non-white level (e.g., black) to render a portion of the text 216 (the top portion of the letter "A" reproduced on the display). The rest of row 230 includes sequences of pixels 218 to the left and right, respectively, of the three black pixels 218. Row 232 includes a sequence of white pixels followed by two black pixels, followed by a single white pixel, followed by two more black pixels, and followed by yet more pixels driven to white. Rows 234 and 236 may similarly include a large number of white pixels broken by sequences of two black pixels, three white pixels, and two black pixels (in the case of row 244), and two black pixels, five white pixels, and two black pixels (in the case of row 236).

The pixels depicted in FIGS. 12 and 13 may be driven based on the data transmitted from the timing controller 86 to a column driver 88 in accordance with the data transmission modes described above. Particularly, a data packet 192 (in accordance with a VLC transmission mode) may be transmitted to the column driver 88 for the first row of pixels of the region 106 having a single common color—white in the presently depicted example—and the column driver 88 may store the appropriate values in the latch 134 and drive the pixels of the first row in accordance with the received data.

For the subsequent rows until the text 216 begins (i.e., until row 230), the timing controller 86 may transmit a data packet 196 indicating that the data sampling skip mode has been enabled, and that the column driver 88 is to drive the row of pixels to the same values stored in the latch 134 and used for the previous row of pixels. For instance, each of rows 220, 222, 224, 226, and 228 may be driven to the same color as the pixels of the preceding row. Consequently, rather than transmitting individual pixel data values for each pixel 218 of these rows, the timing controller 86 may simply transmit an indication that the rows are to be driven to identical values (e.g., by setting a portion 180 of the header 198 for each data packet 196 to indicate the data sampling skip transmission mode). As transmission of such indications would be much shorter in duration than transmitting pixel data values for each pixel of each row, the data channel between the timing controller 86 and the column driver 88 may be selectively placed in a low-power state or otherwise deactivated during the transmission sequence. In other words, the data channel may be deactivated following transmission of each data packet 196, and then reactivated to enable transmission of the next data packet.

For row 230 the timing controller 86 may send a data packet 194 including: a first data value 208 for all of the pixels of the left of text 216 and an associated first repetition number 206 indicating the number of pixels to be driven according to that data value; a second data value 208 for the pixels of text 216 and an associated repetition number 206 indicating that the second data value is to be used to drive a sequence of three pixels; and a third data value 208 and repetition number 206 for the pixels to the right of the text 216. Rows 232, 234, and 236 may also be driven in accordance with data packets transmitted in accordance with a variable-length coding transmission mode, in which the encoded data includes data values 208 and repetition numbers 206 that will be decoded by the column driver 88 to render the desired image.

Figure 14:
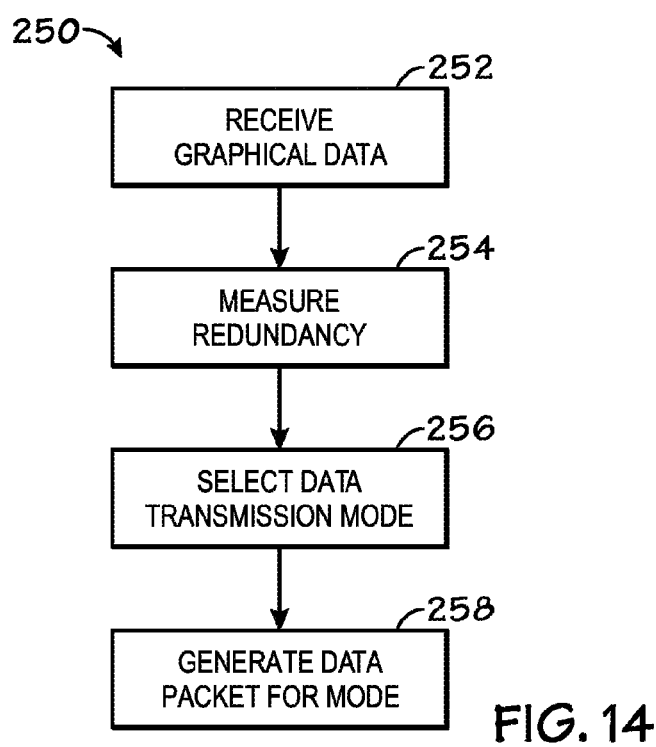
FIG. 14 is a flowchart representing a method for creating data packets for transmission between components of an LCD based on various data transmission modes in accordance with aspects of the present disclosure.

In one embodiment, the timing controller 86 may generate data packets in accordance with flowchart 250 depicted in FIG. 14. Particularly, in this embodiment, at block 252 the timing controller 86 receives graphical data, such as data from the GPU 82. At block 254, the timing controller 86 measures the redundancy of the graphical data, such as by determining sequences of pixels within a row to be rendered that exhibit common pixel values, or by measuring redundancy between adjacent rows of pixels. Based on this analysis, at block 256 the timing controller 86 selects a data transmission mode, such as a normal transmission mode, a VLC transmission mode, or a data sampling skip transmission mode, as discussed above. At block 258, the timing controller 86 generates a data packet for transmission to the column driver 88 in accordance with the selected data transmission mode.

Figure 15:
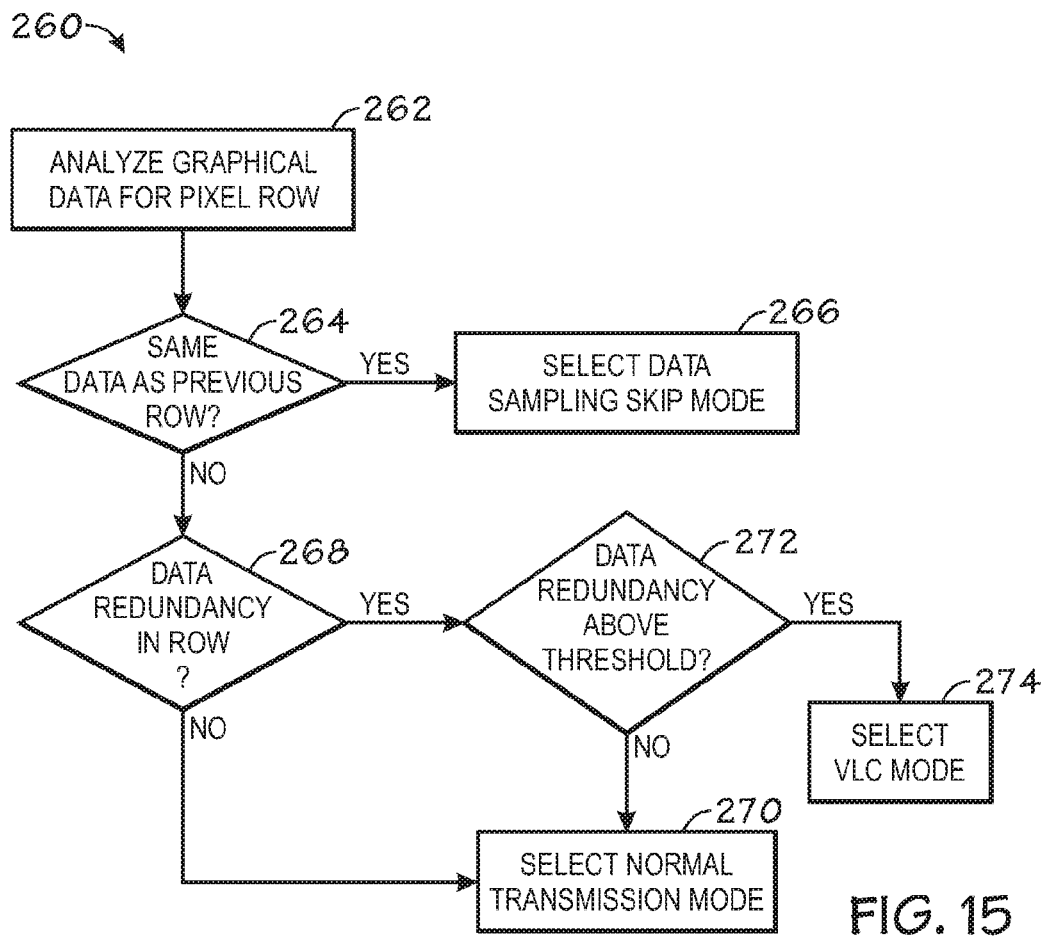
FIG. 15 is a flowchart representing a method for selecting a data transmission mode in accordance with aspects of the present disclosure.

The measuring of redundancy and the selection of data transmission mode by the timing controller 86 may be better understood with reference to flowchart 260 of FIG. 15, which is provided in accordance with one embodiment. In this embodiment, the timing controller 86 may analyze graphical data for a pixel row at block 262. If the graphical data for a given pixel row is identical to that as a previous row (decision block 264), the timing controller 86 may select the data sampling skip transmission mode, as indicated at block 266.

If the data for the pixel row is not identical to a previous row, the timing controller 86 may determine the amount of data redundancy in the graphical data for the pixel row itself at decision block 268. If there is no data redundancy in the data for the pixel row (i.e., each pixel in the row is different than the preceding pixel), the timing controller 86 selects the normal transmission mode at block 270. If data redundancy is in the pixel row does exist, the timing controller 86 may then determine whether the data redundancy is above a desired threshold (decision block 272). For example, the desired threshold may be set based on the size of the data buffer 132 of a column driver 88. In such an embodiment, if the data redundancy in the pixel row is sufficient to allow all of the repetition numbers and associated pixel values to be stored within the data buffer 132, the timing controller 86 may select a VLC transmission mode at block 274. If, however, the data buffer is not sufficiently sized to store all of the repetition numbers and pixel values, the timing controller 86 may instead select the normal transmission mode at block 270.

Figure 16:
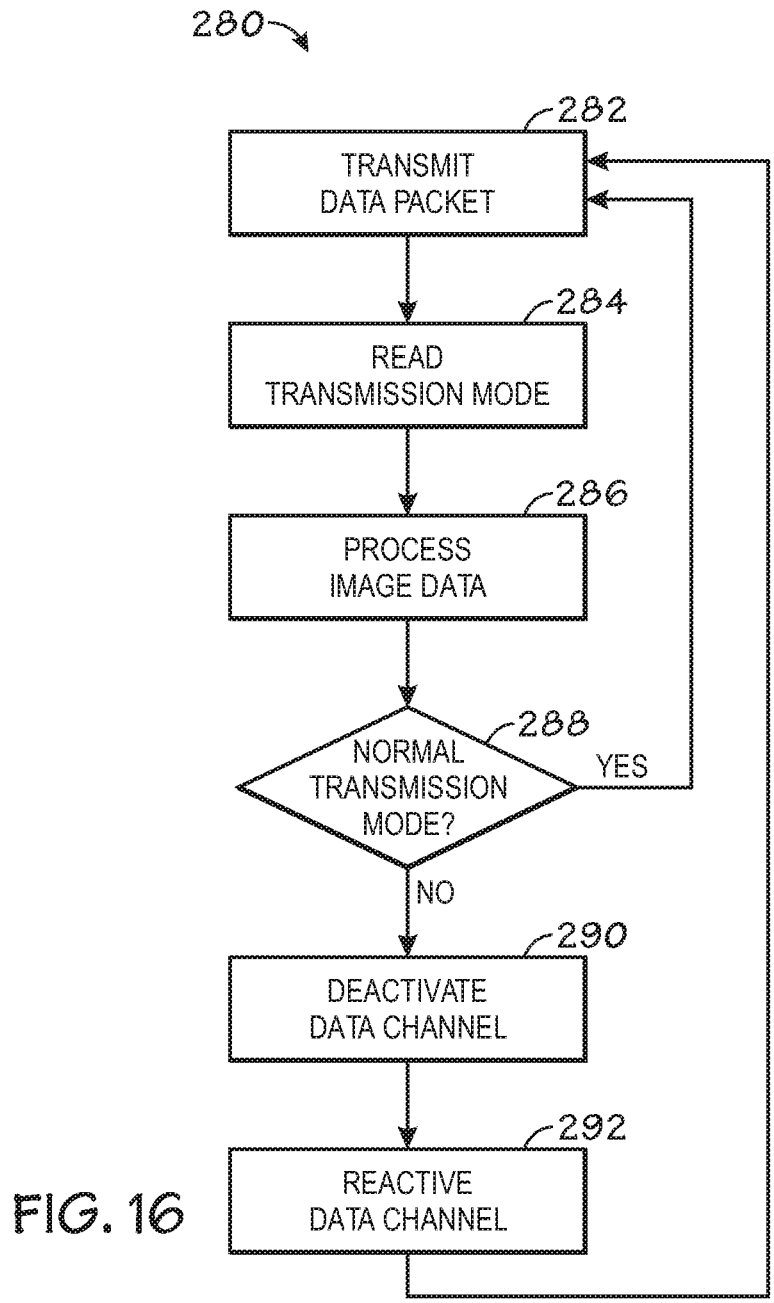
FIG. 16 is a flowchart representing a method for processing image data and selectively deactivating data channels based on the data transmission mode in accordance with aspects of the present disclosure.

Data may be transmitted from the timing controller 86 to a column driver 88 in accordance with flowchart 280 depicted in FIG. 16 in accordance with one embodiment. The data packet generated by the timing controller 86 may be transmitted to the column driver 88 at block 282. The column driver 88 may read the transmission mode, such as from the header of the data packet, at block 284 and process the image data at block 286 in accordance with the determined mode. If the transmission mode is the normal transmission mode (decision block 288), in which discrete pixel values are provided for each pixel to be driven for that particular row of pixels by the column driver 88, then another data packet may be transmitted at block 282 following the receipt of the last pixel value for the previous row of pixels.

If, however, the data packet was instead transmitted via some other transmission mode (e.g., VLC transmission mode or data sampling skip transmission mode), then there may be a period of inactivity of the data channel following receipt of the image data from the timing controller 86 and before the time at which the next data packet for the next row of pixels will be transmitted. Accordingly, in such transmission modes the data channel between the timing controller 86 and the column driver 88 is deactivated at block 290 once the column driver 88 has received any payload of image data for a given row of pixels. The data channel may be reactivated at block 292 to allow the next data packet to be transmitted at block 282. Consequently, by shortening data transmission lengths over the data channel and selectively deactivating the data channel, the LCD 34 may consume less power. Additionally, by reducing the amount of data toggling activity across the data channel, electromagnetic interference resulting from data transmissions is also reduced.

Figure 17:
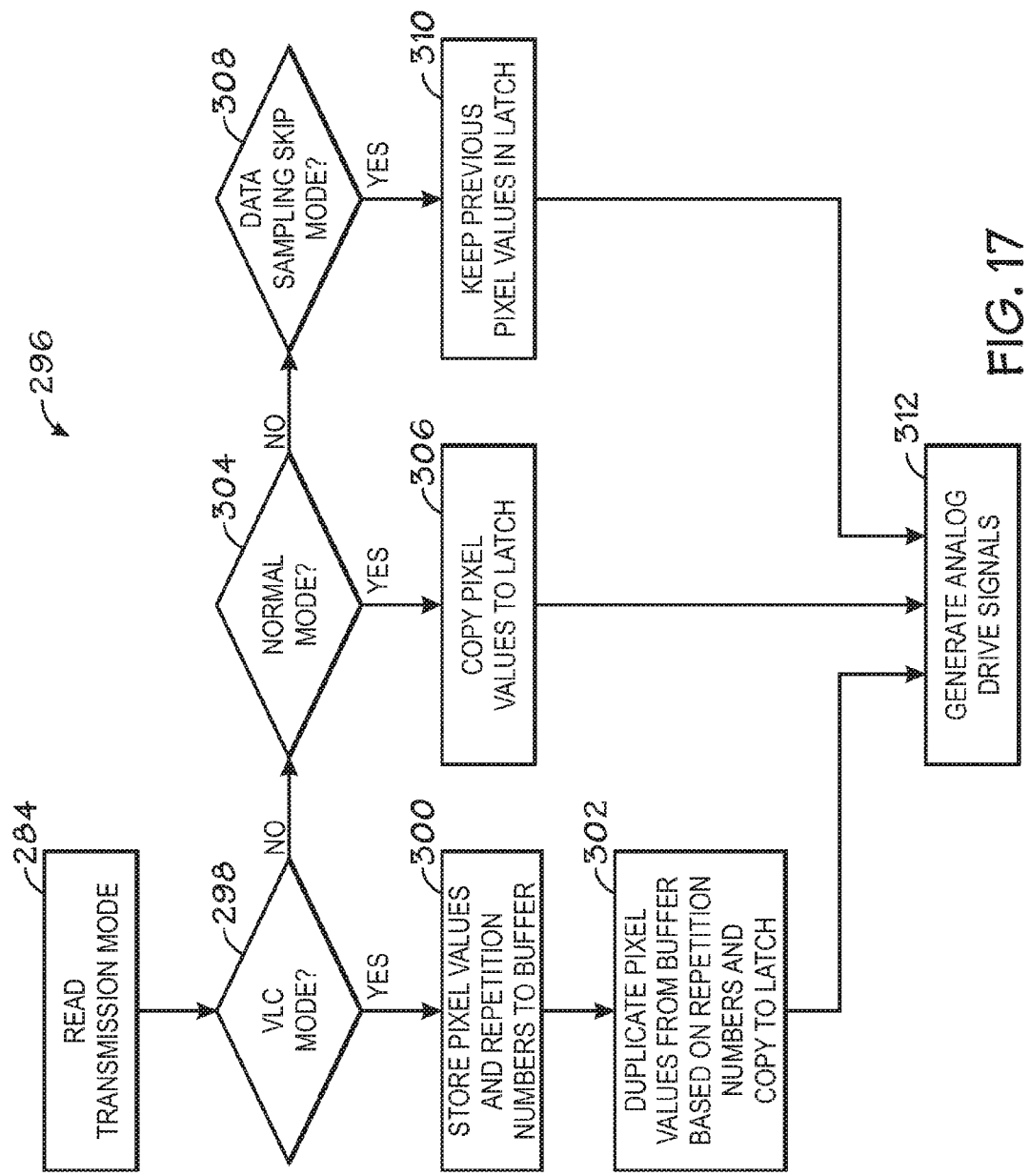
FIG. 17 is a flowchart representing a method for generating drive signals based on the received image data and the selected data transmission mode in accordance with aspects of the present disclosure.

In one embodiment, the column driver may operate in accordance with flowchart 296 of FIG. 17. The column driver 88 may read a transmission mode from a given data packet at block 284. If the column driver 88 determines the data packet is sent in accordance with a VLC transmission mode (decision block 298), the column driver 88 may store, at block 300, pixel values and repetition numbers from the data packet, such as within the data buffer 132. The column driver 88 may then, at block 302, duplicate the stored pixel values based on the stored repetition numbers, and such pixel values may be copied into the latch 134. If the read transmission mode is a normal transmission mode (decision block 304), the data packet containing individual pixel values for each pixel may be processed, and the data values may be copied into the latch 134 at block 306. If instead the read transmission mode is a data sampling skip mode (decision block 308), the column driver 88 may retain the previous pixel values in the latch 134 at decision block 310. Based on the values stored in the latch at blocks 302, 306, and 310, the digital-to-analog conversion circuitry 136 may generate analog signals at block 312 based on the digital values within the latch 134, and the analog signals may be applied to the row of pixels of region 106.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display comprising:
   a thin-film transistor (TFT) liquid crystal display panel including an array of pixels;
   at least one column driver including a data receiver and configured to drive columns of the array of pixels; and
   a timing controller including a data transmitter and configured to transmit pixel data to the data receiver of the at least one column driver via the data transmitter, wherein the timing controller is further configured to determine an amount of redundancy in the pixel data, to compare the determined amount of data redundancy to a threshold, to encode the pixel data using variable-length coding (VLC) when the determined amount of data redundancy is above the threshold such that the encoded pixel data is smaller in size, to transmit the encoded pixel data from the data transmitter to the data receiver of the at least one column driver, and to selectively deactivate the data transmitter following transmission of the encoded pixel data; and
   wherein the at least one column driver is configured to selectively deactivate the data receiver following receipt of the encoded pixel data.

2. The display of claim 1, wherein the at least one column driver includes a plurality of column drivers.

3. The display of claim 2, wherein the data transmitter includes a plurality of data transmitters configured to transmit the encoded pixel data to the plurality of column drivers.

4. The display of claim 3, wherein the plurality of data transmitters includes at least two data transmitters for each column driver of the plurality of column drivers, and the timing controller is configured to deactivate at least one data transmitter of the at least two data transmitters while transmitting the encoded pixel data via another data transmitter of the at least two data transmitters.

5. The display of claim 1, wherein the at least one column driver includes a data decoder configured to decode the encoded pixel data received from the data transmitter.

6. The display of claim 1, wherein the at least one column driver: includes a buffer; is configured to receive the encoded pixel data, the encoded pixel data including a pixel value and a repetition value indicative of the redundancy of the pixel value; is configured to store the pixel value in the buffer; and is configured to at least partially decode the encoded pixel data by copying the pixel value stored in the buffer based on the repetition number.

7. A display panel timing controller comprising:
   a data receiver configured to receive image data;
   a data encoder configured to selectively encode the received image data;
   control logic configured to select a data transmission mode from a plurality of data transmission modes, wherein the control logic is configured to select the data transmission mode based on an analysis of the received image data, and wherein the plurality of data transmission modes includes at least a variable-length coding mode, a non-variable-length coding mode, and a data sampling skip mode; and
   a plurality of data transmitters configured to output the received image data in accordance with the selected data transmission mode, wherein the timing controller is configured to select the data sampling skip mode upon determination that a line of image data to be sent to a column driver is identical to a previous line of image data sent to the column driver, and wherein the timing controller is configured to transmit an indication, different from the line of image data and the previous line of image data, to the column driver to cause the column driver to retain the previous line of image data.

8. The display panel timing controller of claim 7, wherein the non-variable-length coding mode includes a normal mode in which the display panel timing controller is configured to transmit the received image data via the plurality of data transmitters without encoding the received image data via the data encoder.

9. The display panel timing controller of claim 7, wherein the display panel timing controller is configured to transmit image data to one or more column drivers via respective point-to-point data buses.

10. A system comprising:
    a display including a pixel array;
    row driving circuitry and column driving circuitry configured to drive the pixel array, wherein the column driving circuitry includes a plurality of column driver integrated circuits;
    a display panel timing controller configured to receive image data and to control operation of the row driving circuitry and the column driving circuitry, wherein the display panel timing controller is electrically coupled to each column driver integrated circuit of the plurality of column driver integrated circuits by a respective point-to-point data bus including at least one data communication channel, and wherein the display panel timing controller is configured to selectively encode the image data and selectively deactivate the at least one data communication channel based on redundancy in the image data, and wherein each column driver integrated circuit is configured drive a plurality of pixels in a row of the pixel array and to receive encoded image data from the display panel timing controller, the encoded image data including pixel data for at least one pixel of the plurality of pixels in the row and a redundancy number.

11. The system of claim 10, wherein each column driver is configured to store the pixel data for the at least one pixel in a buffer, to drive the at least one pixel based on the pixel data, and to drive one or more additional pixels in the row based on the pixel data for the at least one pixel stored in the buffer, and wherein the number of one or more additional pixels in the row driven based on the pixel data for the at least one pixel is equal to the redundancy number of the encoded image data.

12. The system of claim 10, wherein each column driver includes a data latch configured to receive pixel data for a first sequence of pixels in a first row of the pixel array, and wherein the column driver is configured to drive the first sequence of pixels based on the received pixel data for the first sequence of pixels in the latch and to also drive a second sequence of pixels in a second row of the pixel array based on the received pixel data for the first sequence of pixels in the latch based on an indication from the display panel timing controller that the first and second sequences of pixels are identical.

13. The system of claim 10, comprising a processor configured to generate the image data.

14. The system of claim 10, wherein the system includes at least one of a portable computer system or a handheld electronic device.

15. A method comprising:
receiving graphical data at a display timing controller;
measuring redundancy of the graphical data, wherein measuring redundancy of the graphical data includes identifying one or more sequences of identical pixel data values for one or more respective series of pixels and determining the number of pixels in the one or more respective series of pixels;
selecting a data transmission mode based on the measured redundancy; and
generating an image data packet including a configuration header and a payload of pixel data, wherein generating the image data packet includes setting one or more bits in the configuration header of the image data packet indicative of the selected data transmission mode and generating the payload of pixel data based on the selected data transmission mode, wherein generating the payload of pixel data includes generating the payload to include one repetition number for each sequence of identical pixel data values equal to the number of pixels in the respective series of pixels and one pixel data value for each sequence of identical pixel values equal to the identical pixel data values.

16. The method of claim 15, wherein selecting the data transmission mode based on the measured redundancy includes determining that the redundancy is above a threshold such that a buffer of a column driver receiving the generated image data packet has sufficient capacity to store the one or more pixel data values in the generated payload of pixel data.

17. A method comprising:
transmitting a plurality of data packets over a data channel between a timing controller and a column driver of a display;
reading transmission modes from headers in the plurality of data packets received at the column driver;
processing image data of the plurality of data packets at the column driver based on the respective transmission modes of the plurality of data packets; and
intermittently deactivating the data channel during transmission of the plurality of data packets based on the respective transmission modes of the transmitted plurality of data packets, wherein intermittently deactivating the data channel during transmission of the plurality of data packets includes deactivating the data channel following transmission of a first data packet of two consecutive data packets of the plurality of data packets and activating the data channel before transmitting a second data packet of the two consecutive packets.

18. The method of claim 17, wherein intermittently deactivating the data channel includes deactivating a transmitter of the timing controller.

19. The method of claim 17, wherein transmitting the plurality of data packets includes consecutively transmitting a first data packet and a second data packet, wherein the column driver is configured to drive a first sequence of pixels in a first pixel row of the display in response to the first data packet and to drive a second sequence of pixels in a second pixel row adjacent the first pixel row of the display, wherein the first data packet includes a first header and a payload that includes image data for the first sequence of pixels and the second data packet includes a second header encoding a transmission mode for the second data packet indicating that the second sequence of pixels is to be driven to the same levels as the first sequence of pixels based on the image data of the payload of the first data packet.

* * * * *